(12) United States Patent
Raffenberg et al.

(10) Patent No.: US 7,673,813 B2
(45) Date of Patent: Mar. 9, 2010

(54) PORTABLE SPRAY APPARATUS

(75) Inventors: Michael Raffenberg, Fellbach (DE);
Heiko Rosskamp, Adelberg (DE);
Thomas Stark, Waiblingen (DE);
Markus Pfeifer, Waiblingen (DE);
Heinz Hettmann, Schorndorf (DE);
Markus Zeller, Schorndorf (DE); Klaus Langhans, Winnenden (DE); Sebastian Hansen, Besigheim (DE); Hans-Georg Wiedmann, Backnang (DE); Matthias Müller, Remshalden (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 463 days.

(21) Appl. No.: 11/592,182

(22) Filed: Nov. 3, 2006

(65) Prior Publication Data
US 2007/0102545 A1    May 10, 2007

(30) Foreign Application Priority Data
Nov. 5, 2005   (DE) .................. 10 2005 052 845
Aug. 10, 2006  (DE) .................. 10 2006 037 483

(51) Int. Cl.
| | |
|---|---|
| A62C 15/00 | (2006.01) |
| A62C 5/00  | (2006.01) |
| B05B 7/26  | (2006.01) |
| B05B 7/12  | (2006.01) |
| B05B 7/00  | (2006.01) |
| A61M 11/02 | (2006.01) |
| F16K 31/06 | (2006.01) |

(52) U.S. Cl. .................. 239/152; 239/650; 239/407; 239/311; 239/317; 239/373; 137/595; 137/625.18; 222/630; 222/637

(58) Field of Classification Search ............... 239/152, 239/650, 153, 407, 418, 373, 305, 311, 314, 239/317, 318, 690.1; 137/594, 597, 595, 137/625.18; 222/630, 637
See application file for complete search history.

(56) References Cited

U.S. PATENT DOCUMENTS 2,593,701 A * 4/1952 Sanford .................. 137/98

(Continued)

FOREIGN PATENT DOCUMENTS

DE    17 82 915    3/1976

(Continued)

*Primary Examiner*—Dinh Q Nguyen
*Assistant Examiner*—Steven Cernoch
(74) *Attorney, Agent, or Firm*—Walter Ottesen (57) ABSTRACT

A portable spray apparatus (1) is provided to selectively discharge liquid spray medium and solid dust medium with a blower airflow (7) generated by a blower (6). An adaptor (8) is provided which has at least a channel section (9) of a liquids channel (10) for the liquid spray medium and a channel section (11) of a solids channel (12) for the solid dust medium. The adaptor (8) is releasably connected to a supply vessel (4). The liquids channel (10) and the solids channel (12) open into the blower airflow (7). Various built-in positions of the supply vessel (4) and of the adaptor (8) are freely selectable relative to each other and to the blower unit (3) by the operator. In one built-in position, the liquids channel (10) is connected via its channel section (9) to an interior space (13) of the supply vessel (4) and, in another built-in position, the solids channel (12) is connected to this interior space (13) via the channel section (11) thereof.

16 Claims, 8 Drawing Sheets

U.S. PATENT DOCUMENTS

| | | | |
|---|---|---|---|
| 2,611,649 A * | 9/1952 | Johnson et al. | 516/19 |
| 2,958,155 A * | 11/1960 | Heinz | 222/130 |
| 3,223,286 A * | 12/1965 | Sawyer | 239/654 |
| 3,586,238 A * | 6/1971 | Schmierer et al. | 239/153 |
| 3,758,036 A * | 9/1973 | Bauder et al. | 239/102.1 |
| 4,387,852 A * | 6/1983 | Mattson et al. | 239/143 |
| 4,474,327 A * | 10/1984 | Mattson et al. | 239/143 |
| 4,595,142 A * | 6/1986 | Kawaharazuka et al. | 239/373 |
| 4,600,129 A * | 7/1986 | Kondo | 222/175 |
| 4,949,906 A | 8/1990 | Godwin | |
| 5,240,186 A * | 8/1993 | Dobbins et al. | 239/690.1 |
| 5,429,305 A * | 7/1995 | Munsey | 239/152 |
| 5,813,088 A * | 9/1998 | Wagner et al. | 15/327.5 |
| 5,947,384 A * | 9/1999 | McCauley | 239/152 |
| 6,113,004 A * | 9/2000 | Steingass et al. | 239/152 |
| 6,409,097 B1 | 6/2002 | McCauley | |
| 6,412,707 B1 * | 7/2002 | Wirz | 239/154 |
| D488,487 S * | 4/2004 | Isayama et al. | D15/28 |
| 6,769,628 B1 * | 8/2004 | Vaage et al. | 239/152 |
| 6,837,447 B1 * | 1/2005 | Clark | 239/318 |
| 7,140,449 B1 * | 11/2006 | Ebner | 169/12 |
| 7,437,796 B2 * | 10/2008 | Rappin | 15/327.5 |
| 2002/0175222 A1 * | 11/2002 | Vaage | 239/153 |
| 2008/0035758 A1 * | 2/2008 | Muller et al. | 239/407 |

FOREIGN PATENT DOCUMENTS

GB 609516 10/1948

\* cited by examiner

PORTABLE SPRAY APPARATUS

CROSS REFERENCE TO RELATED APPLICATION

This application claims priority of German patent application nos. 10 2005 052 845.7, filed Nov. 5, 2005, and 10 2006 037 483.5, filed Aug. 10, 2006, and the entire contents of both applications are incorporated herein by reference.

BACKGROUND OF THE INVENTION

Portable spray apparatus are used in fruit orchards, vineyards and vegetable farms for applying a plant protective medium. A plant protective medium is placed in the supply vessel of the spray apparatus. The blower unit generates a blower airflow with which the medium is drawn out and directed to the plant matter to be treated.

Depending upon the application, it can be required to deliver a liquid spray or a solid dust medium. In order to satisfy both requirements with the same basic apparatus, adaptive work is needed. During spray operation, a liquid spray medium is stored in the supply vessel. This liquid spray medium is drawn off from the supply vessel via a liquid channel and, for example, is introduced into the blower airflow by means of a pressure pump. The liquid channel includes a flow line and a return line in combination with the pressure pump. These lines communicate flow conductively with the interior space of the supply vessel. This arrangement is designed for the movement of liquid spray medium.

In dusting operation, a powdered or granulated dust medium is discharged and the liquid channel and the pressure pump are not suitable to convey this medium. Rather, a metering device is used which draws the dust medium from the interior space of the supply vessel. The dust medium is conducted via a solids channel into the blower airflow. This solids channel is adapted to the material characteristics of the powder or granulate.

Insofar as the same basic apparatus is to be utilized for the selective operation with spray medium and solid dust medium, individual assemblies must be exchanged with these assemblies being adapted especially to the liquid or solids to be applied. Complex conversion measures are required. The particular assembly not used must then be separately stored and can become lost.

SUMMARY OF THE INVENTION

It is an object of the invention to provide a spray apparatus wherein the conversion between spray operation and dusting operation is simplified.

The portable spray apparatus of the invention includes: a back carrier frame; a blower unit mounted on the frame; a supply vessel mounted on the back carrier frame and having an interior space wherein a liquid spray medium and a solid dust medium are selectively held to be discharged by the apparatus; the blower unit including a drive motor and a blower driven by the drive motor to generate a blower airflow for selectively discharging the liquid spray medium and solid dust medium; an adapter releasably connected to the supply vessel; a liquids channel for the liquid spray medium opening into the blower airflow; a solids channel for the solid dust medium opening into the blower airflow; the adaptor defining at least one channel section of the liquids channel and at least one channel section of the solids channel; and, the supply vessel and the adaptor having first and second built-in positions relative to each other and/or to the blower unit which are freely selectable by an operator of the apparatus and, in the first position, the liquids channel communicating with the interior space via the liquids section and, in the second position, the solids channel communicating with the interior space via the solids section.

A spray apparatus having an adaptor is provided with the adaptor being releasably connected to the supply vessel. The adaptor has at least one channel section of a liquids channel for the liquid spray medium and a channel section of a solids channel for the solid dust medium. The liquids channel and the solids channel open into the blower airflow. Especially two different built-in positions of the supply vessel and the adaptor relative to each other or relative to the blower unit are freely selectable by the operator. In a first one of the selected built-in positions, the liquids channel is connected via its channel section to the interior space of the supply vessel and, in a second built-in position, the solids channel is connected via its channel section to the interior space of the supply vessel.

The conversion measures of the spray apparatus between the two operating modes are limited to the release of the supply vessel and/or the adaptor. With the change of the built-in position of the vessel and/or the adaptor, the adaptation to the selected operating mode is completed after the subsequent assembly is completed. No different, exchangeable parts or assemblies need to be taken along or held in supply. All required parts are always present on the spray apparatus. Conversion measures can take place at the location where the spray apparatus is used with a few manual operations.

In a preferred embodiment, a pressure pump is mounted in the liquids channel and the liquids channel includes a flow line and a return line for the pressure pump. The adaptor includes overall two channel sections of the liquids channel which are formed by a flow section of the flow line and a return section of the return line. By changing the built-in position of the adaptor and/or of the supply vessel, both lines can be selectively taken into operation immediately or taken out of operation.

Preferably, the channel section of the solids channel is closed in that particular built-in position wherein the liquids channel communicates with the interior space; whereas, in the built-in position in which the solids channel communicates with the interior space, the channel section of the liquids channel is closed. In this way, it is ensured that no dust medium gets into the liquids channel and that no spray medium gets into the solids channel. A change between the two operating modes does not lead to a mixing of residuals remaining in the particular channels. A contamination or a sticking is avoided.

In a practical embodiment, the adaptor includes a channel section of a pressurized air channel which is fed with pressurized air from an overpressure region of the blower. At least in the relative built-in position provided for the spray operation and especially in both relative built-in positions of the adaptor and of the supply vessel to each other, the pressurized air channel is pressure-transmittingly connected to the interior space. The pressurized air channel is guided through the adaptor into the interior space of the supply vessel. This interior space is placed under an inner pressure in the closed state which facilitates the discharge of liquid spray medium or of solid dust medium. By releasing the supply vessel or the adaptor, the pressurized air channel is also interrupted in addition to the liquids channel and the solids channel. There is no connection any longer between the blower unit and the supply vessel. The adaptor and the supply vessel can be freely manipulated. The pressure transmission is established automatically with the connection of the adaptor and the supply vessel.

In a preferred embodiment, the supply vessel includes a base having a center line and a liquids removal opening and a solids removal opening of the base are arranged on the same side of the center line. The liquids removal opening is assigned to the channel section of the liquids channel and the solids removal opening is assigned to the channel section of the solids channel. The adaptor has a center line and the channel section of the liquids channel and the channel section of the solids channel are arranged on different sides of the center line of the adaptor. The base and the adaptor lie next to each other in the assembled state in such a manner that, depending upon the built-in position, either the liquids channel and the liquids opening or the solids channel and the solids opening are in overlapment to each other. At the same time, the corresponding other, unused openings and the assigned channel sections are on different sides of the center lines whereby a flow conducting passthrough is prevented. This arrangement permits a simple conversion between the two modes of operation in accordance with a desired selection via a 180° rotation of the adaptor or the supply vessel. Incorrect assemblies are avoided.

Preferably, the liquids opening and the solids opening are formed in common by an individual opening in the base of the supply vessel. The base of the supply vessel is simple in configuration and insensitive with respect to measurement tolerances. An exact alignment of the comparatively large individual opening relative to the channel section of the liquids channel or to the channel section of the solids channel in the adaptor is not required.

Depending upon the application, it can be practical to provide a fixed unchangeable built-in position of the supply vessel for two different built-in positions of the adaptor or a fixed, non-changeable built-in position of the adaptor for two different built-in positions of the supply vessel. The changeable built-in positions of the supply vessel lead to the situation that the adaptor need not be removed or disassembled during conversion. Especially, the possibility is provided to fixedly assemble the adaptor on the blower unit. Only the supply vessel need be released, rotated and again attached. It is practical that the adaptor is fixedly connected to the blower unit and the supply vessel is releasably connected directly to the adaptor. The number of individual parts is minimized. There are no loose parts, which can become lost, when releasing and rotating the supply vessel.

On the other hand, a simple conversion is possible by changing the built-in position of the adaptor. This permits especially a permanent connection of the supply vessel to the back carrier frame. For this purpose, an attachment by means of antivibration elements can, for example, be provided which need not be released during conversion.

For the above, it is advantageous to configure the adaptor as a separate adaptor plate whose two different built-in positions are formed by rotating the adaptor plate about its center line or about its up axis. Preferably, the supply vessel is directly releasably connected to the blower unit while interposing the adaptor plate therebetween. The conversion between spray operation and dusting operation can take place with few manual movements. In the assembled state, the intermediate-lying adaptor plate is reliably fixed. The supply vessel and blower unit form essentially a mechanically rigid unit which is manually easily releasable especially via quick-release catches. In the tightly connected state, the adaptor is also simultaneously fixed because of its sandwiched arrangement. The essentially rigid assembly unit can be suspended in a defined manner vibration decoupled on the back carrier frame. After releasing the connection between the supply vessel and the blower unit, the adaptor is simultaneously released therewith. A separate attachment means is not needed and the conversion operation is simplified.

In an advantageous embodiment, an up direction is pregiven referred to a usual holding position of the spray apparatus during operation and a lateral direction is defined by the rotational plane of the blower unit configured as a radial blower. The adaptor and especially also the base of the supply vessel referred to the up direction and the side direction are arranged below a highest point of the blower unit. The supply vessel can thereby be arranged almost directly above the blower unit without it being necessary to make available an intermediately-lying structural space for the adaptor and the base in the up direction. The spray apparatus includes overall a lower center of gravity whereby the manipulability is simplified.

It is practical to provide a metering device for the dust medium which is configured as a rotary slide valve. The rotary slide valve includes a reproducible and uniformly adjustable control characteristic for the control of the dust medium mass flow.

Preferably, a carrier airflow is guided into the solids channel downstream of the metering device for the dust medium. A venturi effect can result whereby the carrier airflow draws a dust medium from the supply vessel and entrains the same. This conveyance of the dust medium is simple and effective. Additional conveying devices, pumps, blowers, et cetera are unnecessary.

BRIEF DESCRIPTION OF THE DRAWINGS

The invention will now be described with reference to the drawings wherein:

FIG. 1 shows a side elevation view of a portable spray apparatus having a supply vessel and a blower unit which is provided for the selective discharge of liquid spray medium or solid dust medium with the arrangement of the liquids channel with a pressure pump being shown schematically;

FIG. 2 is a rear elevation view of the spray apparatus of FIG. 1 with additional details of the arrangement of a solids channel for outputting solid dust medium with an adaptor mounted between the supply vessel and the blower unit;

FIG. 3 is a schematic plan view of the base of the supply vessel of FIGS. 1 and 2 having liquids openings and a solids removal opening lying opposite thereto;

FIG. 4 is a schematic plan view of the adaptor of FIG. 2 with a flow channel section, a return channel section and a section of the solids channel arranged on the same side;

FIG. 5 is a plan view of the base, which lies above the adaptor of FIG. 4, in a start position wherein the liquids channel is in overlapment with the liquids openings;

FIG. 6 shows the arrangement of FIG. 5 with the adaptor rotated by 180° relative to the arrangement of FIG. 5 and the solids channel and the solids removal opening are in overlapment with each other;

FIG. 7 shows the arrangement of FIG. 5 with the base rotated by 180° relative to the start position shown in FIG. 5 wherein the solids channel and the solids removal opening are in overlapment to each other;

FIG. 8 is a schematic section view of the arrangement of FIG. 2 in the region of the adaptor wherein the adaptor is configured as an adaptor plate having integrated liquids and solids channels and is mounted in a position for the solids operation;

DESCRIPTION OF THE PREFERRED
EMBODIMENTS OF THE INVENTION

Figure 1:
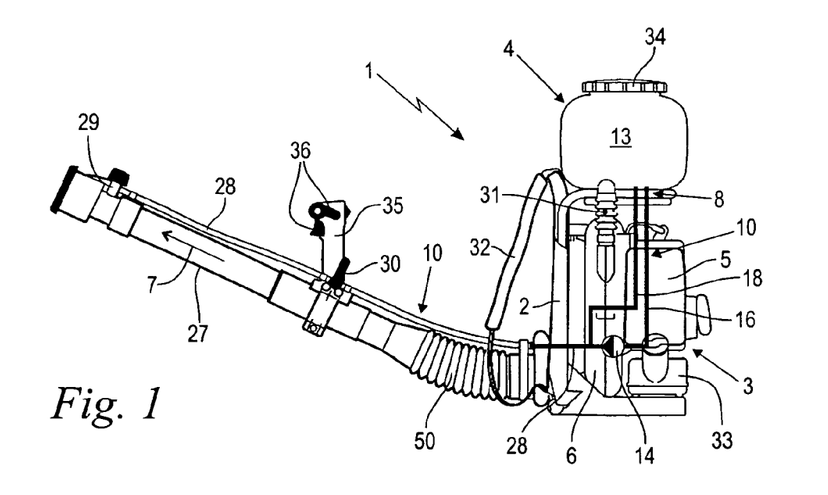

FIG. 1 shows a side elevation view of a portable spray apparatus 1 having a back carrier frame 2 on which a blower unit 3 and a supply vessel 4 are attached for a material which is to be discharged. The material, which is to be discharged, can selectively be a liquid spray medium or a solid dust medium which are held in supply in an interior space 13 of the supply vessel 4 during operation.

The blower unit 3 includes a drive motor 5 which is an internal combustion engine in the embodiment shown. However, the drive motor can also be an electric motor or the like. A fuel tank 33 is held on the back carrier frame below the drive motor 5 for supplying the same with fuel. Furthermore, the blower unit 3 includes a blower 6 which is a radial blower in the embodiment shown. The blower can also be an axial blower or the like. The blower 6 is driven by the drive motor 5 and generates a blower airflow 7 which is guided through the blower tube 27 and is supplied to the plant matter which is to be treated. The blower tube 27 is flow-conductively connected to the blower 6 via a folding bellows 50.

During operation, the spray apparatus 1 is carried on the back of an operator (not shown) with the back carrier frame 2 and carrying belts 32 attached thereto. The operator grasps a handle 35 on the blower tube 27 and can control the blower tube 27 with respect to its direction with the handle 35 with the folding bellows 50 deforming elastically. Operator-controlled elements 36 for controlling the engine power of the drive motor 5 are arranged on the handle 35. A pressure line 28 runs parallel to the blower tube 27 along the outer contour thereof. A control valve 30 is arranged in the pressure line 28 at the base of the handle 35. The control valve 30 can be actuated in the same manner as the operator-controlled element 36 by the hand of the operator holding the handle 35.

The portable spray apparatus 1 shown is provided for discharging liquid spray medium or solid dust medium in the same manner. The discharge of these mediums from the interior space 13 of the supply vessel 4 can be undertaken by the following: the suction action of the blower airflow 7; the weight; an inner pressure in the interior space 13 of the supply vessel 4; a pressure pump 14; or other suitable conveying means as well as via a combination of the above-mentioned measures. For the generation of the inner pressure in the interior space 13 of the supply vessel 4, the supply vessel has a cover 34 on its upper end with which the supply vessel 4 can be closed pressure tight. The inner pressure in the interior space 13 is greater relative to the ambient pressure. A pressurized air channel 31 is provided which branches off from the overpressure region of the blower 6 and opens into the interior space 13 of the supply vessel 4. During operation, the blower 6 generates an overpressure relative to the ambient pressure in addition to the blower airflow 7. This overpressure is transmitted via the pressurized air channel 31 into the interior space 13 and subjects the interior space to an overpressure.

An adaptor 8 is mounted at the lower side of the supply vessel 4 between the supply vessel and the blower unit 3. A releasable but nonetheless tight connection is present during operation between the adaptor 8 and the supply vessel 4. A liquids channel 10 is provided for the discharge of liquid spray medium and this channel 10 is in flow conducting connection to the inner space 13 of the supply vessel 4. The liquids channel 10 supplies the liquid spray medium from the supply vessel 4 to the blower airflow 7.

In the embodiment shown, the liquids channel 10 includes a flow line 16, the pressure line 28 and a return line 18. The flow line 16 leads from the supply vessel 4 to the pressure pump 14 which pumps the liquid spray medium from the interior space 13 and, under pressure, through the pressure line 28 and a nozzle 29 at the free end of the blower tube 27 into the blower airflow 7. The pumped quantity of liquid spray medium through the pressure line 28 is adjustable by means of the control valve 30. The pumping capacity of the pressure pump 14 is supported by the internal pressure in the supply vessel 4 and the suction effect at the nozzle 29. The return line 18 branches off from the pressure line 28. Excess pumped spray medium is conducted back into the interior space 13 via the return line 18. It can be practical to omit the return line 18. The flow line 16 and the return line 18 are both passed through the adaptor 8. The function of the adaptor is described in greater detail hereinafter. The pressurized air channel 31 is, for example, guided on the outside about the adaptor 8 but can also be guided through the adaptor 8 as shown in FIGS. 3 to 7.

Figure 2:
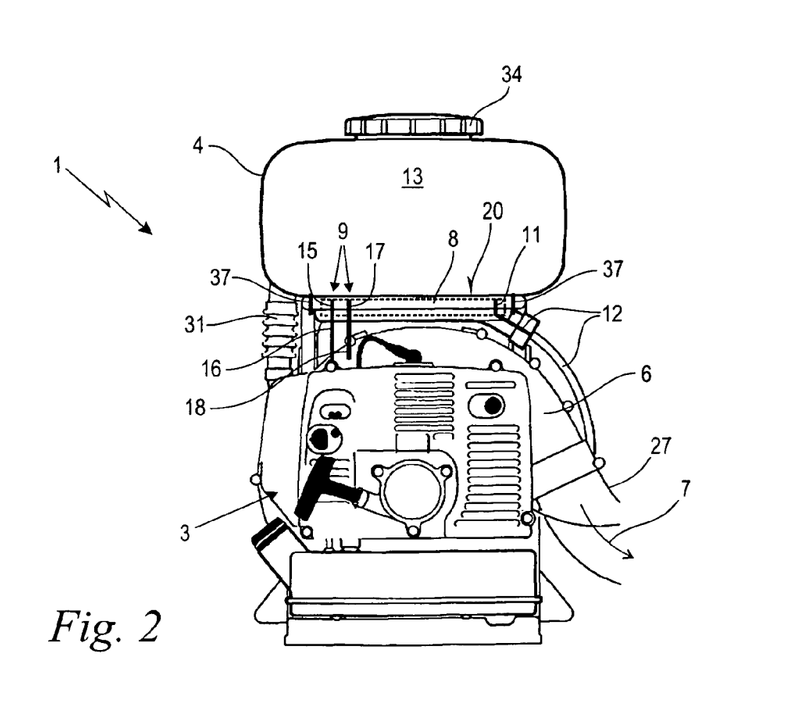

FIG. 2 shows a rear view of the spray apparatus 1 of FIG. 1. Only short sections of the flow line 16 and of the return line 18 are indicated schematically to provide a better overview.

Furthermore, a solids channel 12 is provided for the alternative operation with a solid dust medium. The solids channel communicates with the interior space 13 of the supply vessel 4. The solids material channel 12 is connected to the blower airflow 7 in the same manner as the liquids channel 10. The solid dust medium can be introduced into the blower tube 27 from the supply vessel 4 through the solids material channel 12 via a metering device (not shown) under the additional action of the inner pressure in the interior space 13, the weight and the suction action of the blower airflow 7.

A holding flange 38 is provided on the upper side of the blower 6 and the supply vessel 4 is attached thereto by means of two quick-release catches 37. During operation, a fixed connection is formed between the supply vessel 4 and the blower unit 3 with this connection being essentially rigid mechanically. This essentially rigid connection is, however, releasable by means of the quick-release catches 37. An adaptor 8 is mounted in the interior space of the trough-shaped holding flange 38. The flow line 16, the return line 18 and the solids channel 12 are guided through the adaptor 8.

Two channel sections 9 of the liquids channel 10 (FIG. 1) as well as a channel section 11 of the solids channel 12 run through the adaptor 8. The two channel sections 9 of the liquids channel 10 are formed by a flow section 15 of the flow line 16 and a return section 17 of the return line 18. For an embodiment wherein the return line 18 is omitted, only the flow section 15 is provided as the only channel section 9 of the liquids channel 10.

To provide a better overview, only the channel section 11 as well as the flow section 15 and the return section 17 are shown in a position wherein the solids channel 12 and the liquids channel 10 communicate flow conducting with the interior space 13 of the supply vessel 4. Actually, however, no simultaneous connection is provided in accordance with the invention but a flow-conducting connection is only alternatively provided which is apparent from FIGS. 3 to 9 and the corresponding description.

After releasing the quick-release catches 37, the adaptor 8 and/or the supply vessel 4 can be changed in the built-in position relative to each other or relative to the blower unit 3. Accordingly, either the built-in position of the adaptor 8 is changed while the built-in positions of the supply vessel 4 and the blower unit 3 remain the same or the built-in position of the supply vessel 4 including its base 20 is changed while the position of the adaptor 8 and the blower unit 3 remain the same. It can also be practical to change the built-in position of the supply vessel 4 in common with the adaptor 8 in the same direction relative to the blower unit 3. A base 20 of the supply vessel 4 and the adaptor 8 are matched to each other in a manner described hereinafter so that, depending upon the relative built-in positions, either the solids channel 12 has a flow-conducting connection to the interior space 13 via its channel section 11 or the flow line 16 has a flow-conducting connection to the interior space 13 via its flow section 15 and the return line 18 via its return section 17.

In all different built-in positions, the adaptor 8 is clamped between the supply vessel 4 and the blower unit 3 by means of the snap buckles 37. The pressurized air channel 31 is guided laterally outside about the holding flange 38 and the adaptor 8 and is continuously in flow-conducting connection to the interior space 13. In correspondence to FIGS. 3 to 7, it can, however, also be practical to guide the pressurized air channel 31 through the adaptor 8.

The principal function of the interaction of the adaptor 8 with the supply vessel 4 is shown schematically in FIGS. 3 to 7.

Figure 3:
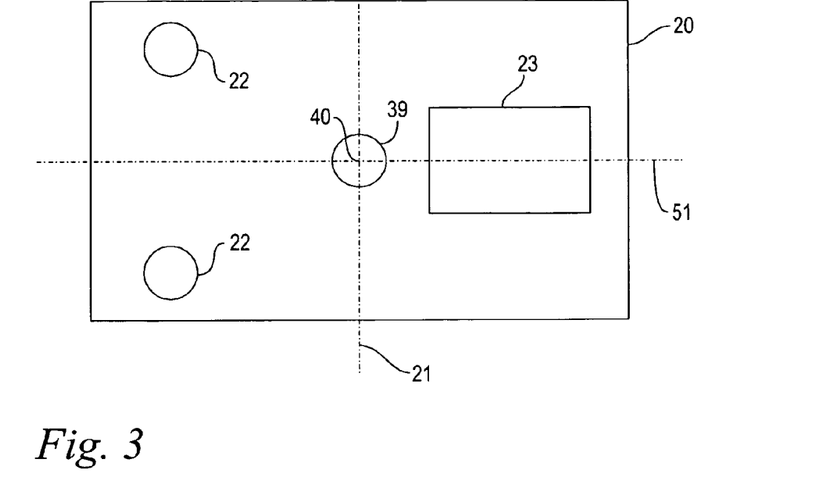

FIG. 3 shows a schematic plan view of the base 20 of the supply vessel 4 of FIGS. 1 and 2. The base 20 is built up essentially mirror symmetrically to two center lines (21, 51) which are perpendicular to each other and includes a solids removal opening 23 as well as two liquids openings 22. The two liquids openings 22 are arranged mirror symmetrically to the center line 51 on the same side of the center line 21; whereas, the solids removal opening 23 is arranged centrally on the center line 51 but, referred to the center line 21, is opposite the two liquids openings 22. An up axis 40 passes through the intersect point of the two center lines (21, 51) and defines a center axis of a pressure opening 39. Departing from the illustration of FIGS. 1 and 2, the pressure opening 39 is provided for the case wherein the pressurized air channel 31 is passed through the adaptor 8. It can also be practical to arrange the pressure opening 39 off center, that is, next to the up axis 40. The supply vessel 4, which is shown in FIGS. 1 and 2, can be built in rotated about the up axis 40 in two different built-in positions by 180° relative to each other.

Figure 4:
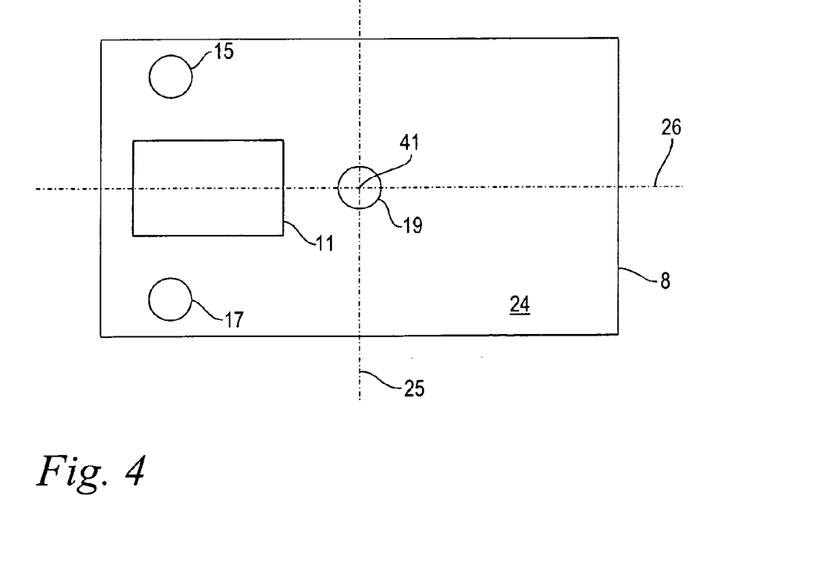

FIG. 4 shows a schematic plan view of the adaptor 8 of FIGS. 1 and 2 with the adaptor 8 being configured as an adaptor plate 24 in the embodiment shown. The adaptor plate 24 has two mutually perpendicularly running center lines (25, 26). The two center lines (25, 26) intersect at an up axis 41 which is perpendicular thereto. The up axis 41 also defines a center line for a channel section 19 of the pressurized air channel 31 (FIG. 2) arranged where these center lines intersect. The channel section 19 in the adaptor plate 24, as the pressure opening 39 in the base 20 of FIG. 3, is provided for the case that the pressurized air channel 31 is conducted through the adaptor plate 24 in departure from what is shown in FIGS. 1 and 2. It can also be practical to arrange the channel section 19 off center, that is, next to the up axis 41.

The adaptor plate 24 shown is built up mirror symmetrically to the center line 26 and the channel section 11 of the solids channel 12 (FIG. 2) lies centrally on the center line 26. The flow section 15 and the return section 17 are arranged mirror symmetrically with respect to each other referred to the center line 26 and lie in common with the channel section 11 on the same side of the center line 25. The adaptor plate 24 is provided for two different built-in positions to be selected by the operator. Starting from the built-in position shown here, the second built-in position is achieved either by a 180° rotation about the up axis 41 or by a 180° rotation about the center line 25.

Figure 5:
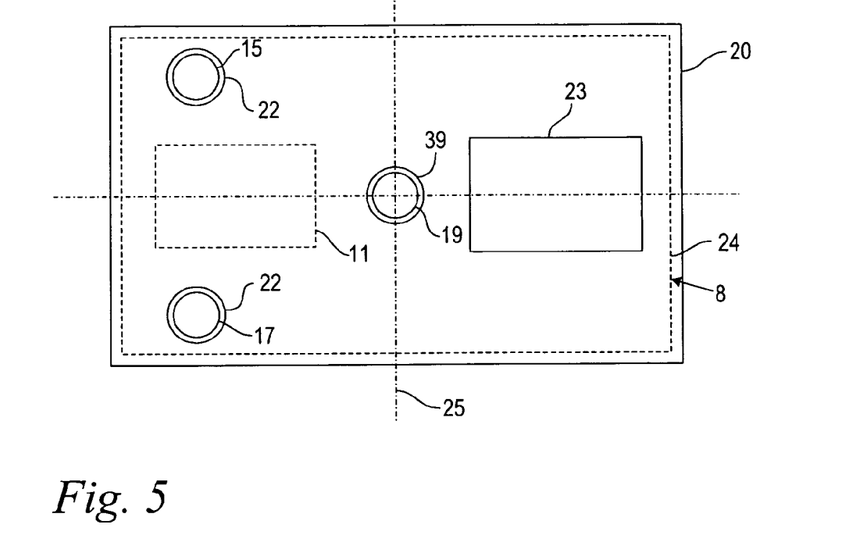
Figure 6:
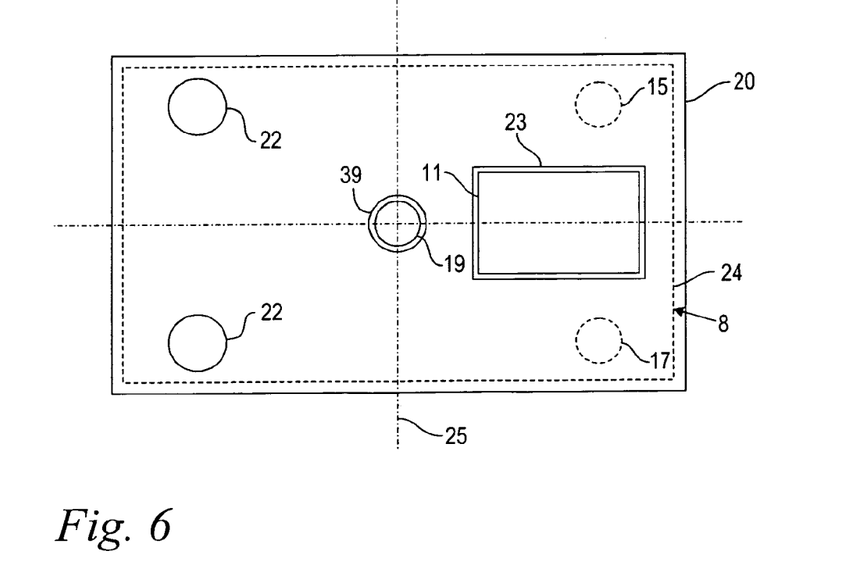

In correspondence to FIG. 5, it can be seen that, in the assembled state, the base 20 of FIG. 3 lies above the adaptor plate 24 of FIG. 4 such that, in the plan view shown, the center lines (21, 25) as well as the center lines (51, 26) (FIGS. 3 and 4) are each congruent. Here, the pressure opening 39 lies in overlapment with the channel section 19 and defines a flow-conducting connection between the pressurized air channel 31 (FIG. 2) and the interior space 13 of the supply vessel 4. At the same time, the flow line section 15 and the return section 17 lie in overlapment with the assigned liquids openings 22. A flow-conducting connection is produced between the flow line 16 and the return line 18 with the interior space 13 of the supply vessel 4 in correspondence to the illustration of FIGS. 1 and 2.

In the start position shown here for the operation with liquid spray medium, the solids removal opening 23 and the channel section 11 are disposed on different sides of the center line 25. The solids removal opening 23 is closed flow tight by the adaptor plate 24; whereas, the channel section 11 of the solids channel 12 (FIG. 2) in the adaptor plate 24 is closed flow tight by the base 20.

Proceeding from the start position for the spray operation shown in FIG. 5, a conversion to dust operation can take place in two ways. According to FIG. 6, the base 20 of the supply vessel 4 (FIG. 2) retains its position while the adaptor plate 24 is rotated. After a 180° rotation about the center axis 25 or the up axis 41 (FIG. 4), the channel section 11 of the solids channel 12 (FIG. 2) lies in flow-conducting overlapment with the solids removal opening 23 whereby a connection of the solids channel 12 is established with the interior space 13 (FIG. 2). The flow section 15 and the return section 17 lie, referred to the center line 25, opposite the liquids openings 22 of the base 20 and are closed flow tight and pressure tight by the base 20. At the same time, the liquids openings 22 in the base 20 are closed flow tight and pressure tight by the adaptor plate 24. In this relative built-in position also, the channel section 19 of the pressurized air channel 31 (FIG. 2) and the pressure line 39 lie in overlapment to each other. The apparatus is ready for the dust operation. A reassembly into the readiness for the spray operation takes place by a return rotation of the adaptor plate 24 whereby the relative position shown in FIG. 5 is again established.

Figure 7:
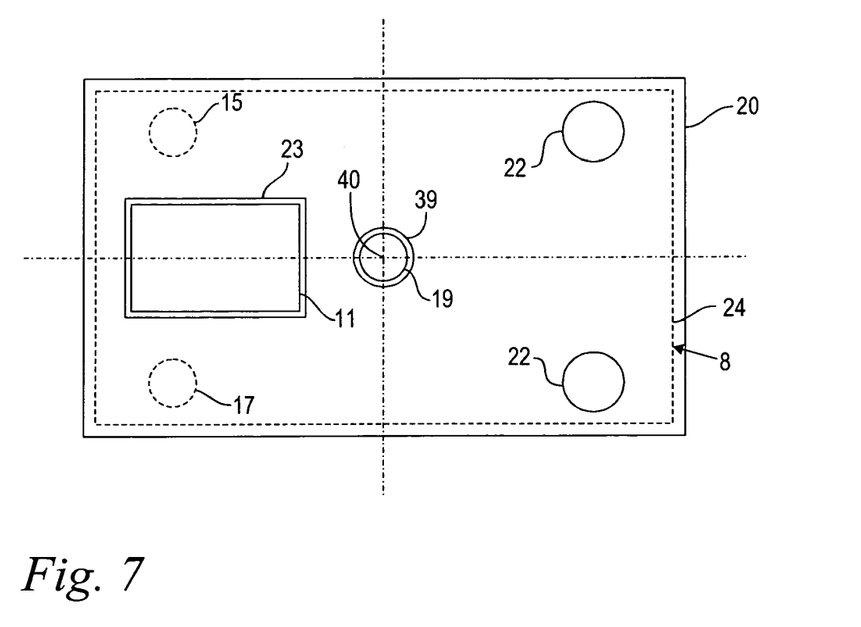

Proceeding from the configuration for the spray operation of FIG. 5, a further option for producing the configuration for the dust operation comprises leaving the built-in position of the adaptor plate 24 corresponding to that shown in FIG. 7 unchanged and to rotate the supply vessel 4 (FIG. 2) with its fixedly connected base 20 by 180° about the up axis 40. It can 
also be practical to rotate the base 20 as an individual part whereas the remaining components remain unchanged in their relative positions. The same configuration results as in the illustration of FIG. 6 having the same features and functional characteristics which configuration is distinguished only by a built-in position rotated by 180°. The variation shown in FIG. 7, however, permits mounting the adaptor 8 fixedly on the blower unit 3 (FIG. 2). Details of a corresponding embodiment are described hereinafter in connection with FIGS. 10 to 13.

In all of the different relative built-in positions shown here, the channel section 19 of the pressurized air channel 31 (FIG. 2) defines a pressure-conducting connection between the overpressure region of the blower 6 and the interior space 13 of the supply vessel 4 (FIG. 2). On the one hand, a pressure compensation in the interior space 13 of the supply vessel 4 can be provided to compensate for removed spray medium or dust medium. On the other hand, and especially in spray operation, the overpressure, which arises in the interior space 13 of the supply vessel 4, can be used for a pressure conveying of the spray medium. Then, the arrangement of a pressure pump 14 (FIG. 1) can be omitted as may be possible. It can be practical to arrange the channel section 19 of the pressurized air channel 31 and the pressure opening 39 in the base 20 of the supply vessel 4 in such a manner off center to the particular up axes (40, 41) (FIGS. 3 and 4) that they only lie in overlapment to each other in the relative position provided for the spray operation. This overlapment is ended with a rotation into the dusting position. A pressure conveying or a pressure compensation takes place then only in the spray operation.

While retaining the principle shown in FIGS. 3 to 7, it can also be practical to arrange the liquids openings 22 and the solids removal opening 23 of FIG. 3 on the same side of the center line 21 while, at the same time, the channel section 11 in the adaptor plate 24 of FIG. 4 is arranged opposite to the flow section 15 and to the return section 17 referred to the center line 25.

Figure 8:
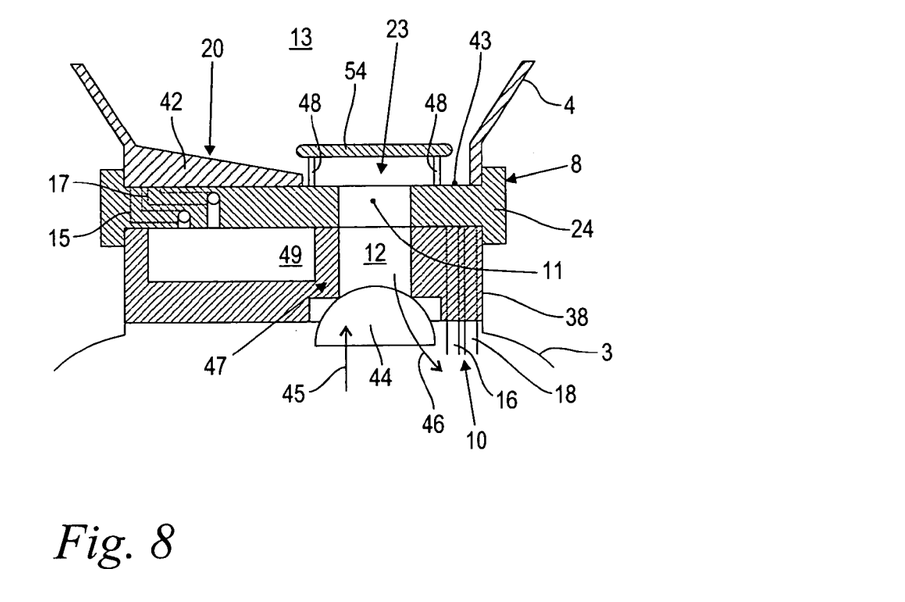
Figure 9:
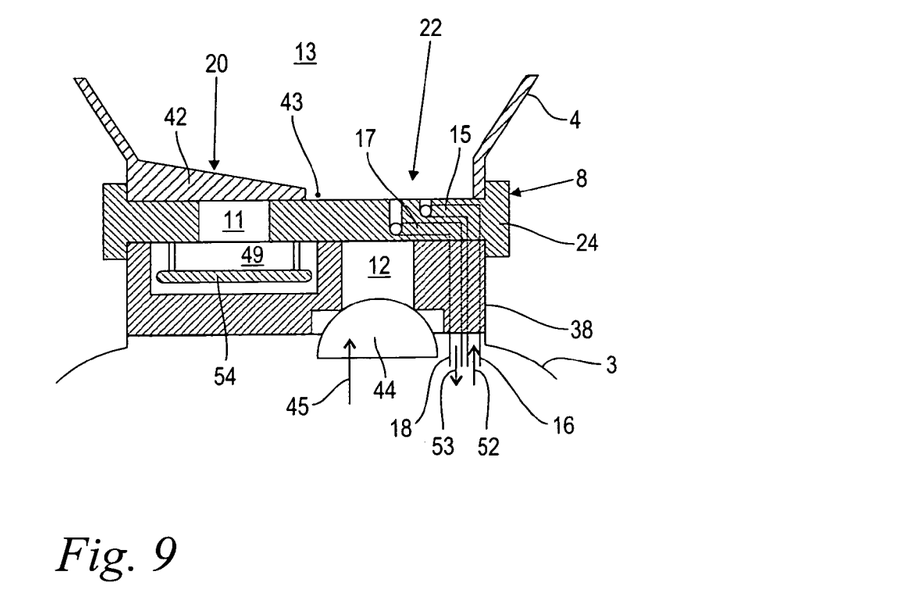
FIG. 9 is a schematic of the arrangement of FIG. 8 with an adaptor plate built in so as to be rotated in operation for the liquid discharge.

FIGS. 8 and 9 show a cross-sectional view of the spray apparatus 1 of FIGS. 1 and 2 in the region of the connecting location between the supply vessel 4 and the blower unit 3 together with a further embodiment of the adaptor 8. A through-extending part of the solids channel 12 is formed in the holding flange 38 of the blower unit 3. A closed receptacle space 49 is disposed on the upper side of the solids channel 12 laterally next to this through-extending part of the solids channel 12. The receptacle space 49 is open only in the direction of the supply vessel 4. The shown part of the solids channel 12 is closed on its underside by a semispherical valve 44 which is so pretensioned by a pressure spring (not shown) in the direction of an arrow 45 that the shown part of the solids channel 12 is closed flow tight. In the embodiment shown, the adaptor plate 24 engages around the holding flange 38 as well as the base 20 of the supply vessel 4 in the manner of an annular flange.

FIG. 8 shows the built-in position provided for the dust operation. In this built-in position, the solids channel 12 is guided through the adaptor plate 24 and is flow-conductively connected to the interior space 13 via the formed-in channel section 11.

The base 20 of the supply vessel 4 is provided with an inclined surface 42 which runs laterally inclined downwardly to a laterally offset opening 43 in the base 20 referred to the shown usual upright position. The opening 43 is an overlapment with the channel section 11 of the solids channel 12 which is likewise laterally offset referred to the center line. The opening 43 in the base 20 operates here as a solids removal opening 23.

A sieve 54 for the solid dust medium is provided on the adaptor 8. This dust medium is held in storage in the interior space 13 of the supply vessel 4. The sieve 54 is held on the adaptor 8 by means of struts 48 and projects from the adaptor 8 through the solids removal opening 23 and into the interior space 13 of the supply vessel 4. The sieve 54 and the semispherical valve 44 are part of a metering device 47 which is provided for metering the discharge quantity of the dust medium.

Figure 10:
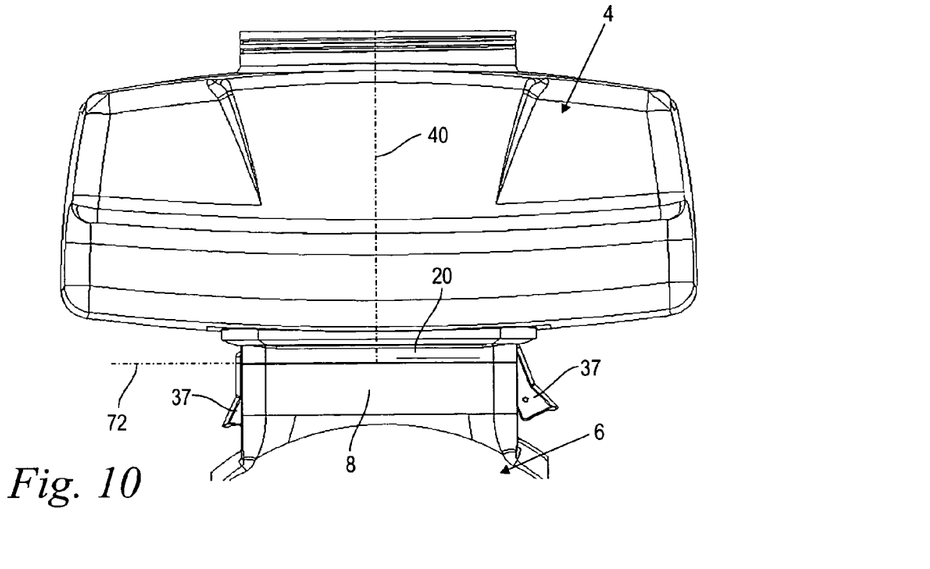
FIG. 10 is a rear elevation view of an additional embodiment of the invention in the region of the supply vessel which is provided for assembly on an adaptor fixed on the blower; the supply vessel can be mounted on the adaptor in two different positions rotated by 180° relative to each other.

The pressurized air channel 31, which is shown in FIGS. 1 and 2, is not shown here for the sake of clarity. The pressurized air channel 31 can be guided past the adaptor 8 on the outside thereof corresponding to FIGS. 1 and 2 or, corresponding to FIGS. 3 to 7, the pressurized air channel 31 can be guided through the adaptor 8. Because of the pressurized air channel 31, the interior space 13 is subjected to overpressure during operation. The overpressure acts via the solids removal opening 23 and the solids channel 12 on the semispherical valve 44 and lifts the latter from its seal seat opposite to the direction of arrow 45. The dust medium, which is metered by the metering device 47, can be moved out from the interior space 13 through the solids channel 12 and past the semispherical valve 44 in the direction of arrow 46 and, as shown in FIG. 2, be directed to the blower airflow 7.

In the built-in position of the adaptor plate 24 provided for the dust operation as shown here, the flow section 15 and the return section 17 are not in flow-conductive or pressure transmitting connection to the interior space 13. Instead, they are arranged on the side of the adaptor plate 24, which lies opposite to the metering device 47, and open into the receptacle space 49. The adaptor plate 24 is seal tight and clampingly held between the supply vessel 4 and the holding flange 38 whereby the receptacle space 49 is sealed off. The receptacle space 49 seals with its walls the flow section 15 and the return section 17. At the same time, the parts of the flow line 16 and the return line 18, which run in the holding flange 38, are closed flow tight and pressure tight by the adaptor 8.

In the embodiment shown, the solids channel 12 is guided through the adaptor 8 and the holding flange 38 whereby, even for a removed adaptor plate 24, the solids channel 12 is permanently connected, if required, with a hose section extending from the holding flange 38. It can also be practical to guide the solids channel 12 directly out of the adaptor plate 24 with a suitable hose line or the like being connected to the adaptor plate 24. In an analog manner, the same applies to the liquids channel 10.

FIG. 9 shows the arrangement of FIG. 8 wherein the adaptor plate 24 is arranged rotated by 180° referred to the center line 25 shown in FIG. 4. The metering device 47 is stored projecting reversed downwardly into the receptacle space 49. The channel section 11 of the solids channel 12, which is arranged in the adaptor plate 24, is closed and sealed by the base 20 and the receptacle space 49. The part of the solids channel 12, which is arranged in the holding flange 38, is closed flow tight and pressure tight by the adaptor plate 24. At the same time, the flow line 16 and the return line 18 open into the interior space 13 via flow section 15 and return section 17, respectively. The opening 43 in the base 20 functions as a common liquids opening 22 for the flow line 16 and the return line 18. The liquid spray medium stored in the interior space 13 can be conveyed and discharged in correspondence to the illustration of FIG. 1.

The supply vessel 4 is attached directly to the blower unit 3 via quick-release catches 37. The adaptor plate 24 is clampingly held between the base 20 of the supply vessel 4 and the holding flange 38 by the action of the tension force of the quick-release catches 37.

FIG. 10 shows a rear view of a further embodiment of the invention in the region of the supply vessel 4. For assembly, the supply vessel 4 is provided in two different positions on the adaptor 8 fixed to the apparatus. These two positions are rotated by 180° about the up axis 40 relative to each other. For this purpose, the vessel 4 has a base 20 which is manufactured as a single part and is connected tightly to the vessel section of the supply vessel 4 with the single part being shown in greater detail in FIGS. 11 and 12. For this purpose, an adhesive, welding, threaded fasteners or also a one-piece configuration can be practical.

The adaptor 8 is connected tightly to the blower 6. Here too, an adhesive, welding, threaded fasteners or the like can be advantageous. A partition plane 72 runs between the base 20 of the supply vessel 4 and the adaptor 8 of the blower 6. Two lateral quick-release catches 37 grasp over the partition plane 72. The quick-release catches 37 are mounted laterally securely on the adaptor 8 and engage in corresponding receptacles of the base 20. After releasing the quick-release catches 37, the assembly unit of the supply vessel 4 with the base 20 can be removed along the partition plane 72 from the assembly of the blower 6 and the adaptor 8 and can be rotated by 180° about the up axis 40 and be again attached. It can also be practical to releasably attach the base 20 to the rest of the supply vessel 4, for example, by means of threaded fasteners or quick-release catches. In this case, a conversion between dust operation and spray operation can also take place in that only the base 20 is rotated by 180° while the remaining components retain their built-in position relative to each other.

Figure 11:
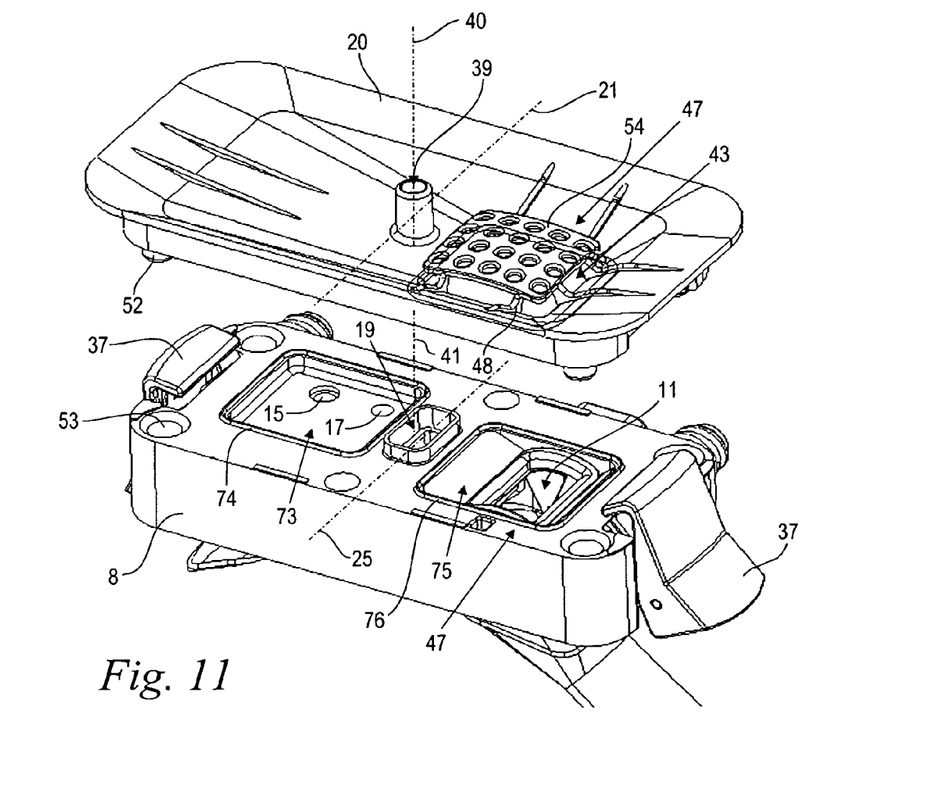
FIG. 11 is a perspective exploded view of the arrangement of FIG. 10 showing details of the adaptor and the vessel base.

FIG. 11 shows a perspective exploded view of details of the arrangement of FIG. 10. The base 20 is shown released from the rest of the vessel section of the supply vessel 4 (FIG. 10) to provide a better overview. Corresponding to FIG. 3, the base 20 has a center line 21 and an up axis 40. A tube stub is configured as one piece with the base 20 coaxially to the up axis 40 and this tube stub surrounds the pressure opening 39 for a pressure charging of the supply vessel 4.

On one side next to the center line 21, an opening 43 is formed in the base 20 which is covered partially by a sieve 54. As in the embodiment of FIGS. 8 and 9, the sieve 54 is part of a metering device 47 for a dust medium. Departing from the illustration of FIGS. 8 and 9, the sieve 54 is, however, attached by means of struts 48 to the base 20 and is configured as one piece as an injection-molded part. In correspondence to the embodiment of FIGS. 8 and 9, the opening 43 forms a solids removal opening 23 (FIG. 8) or a liquids opening 22 (FIG. 9) depending upon the built-in position of the base 20.

Figure 12:
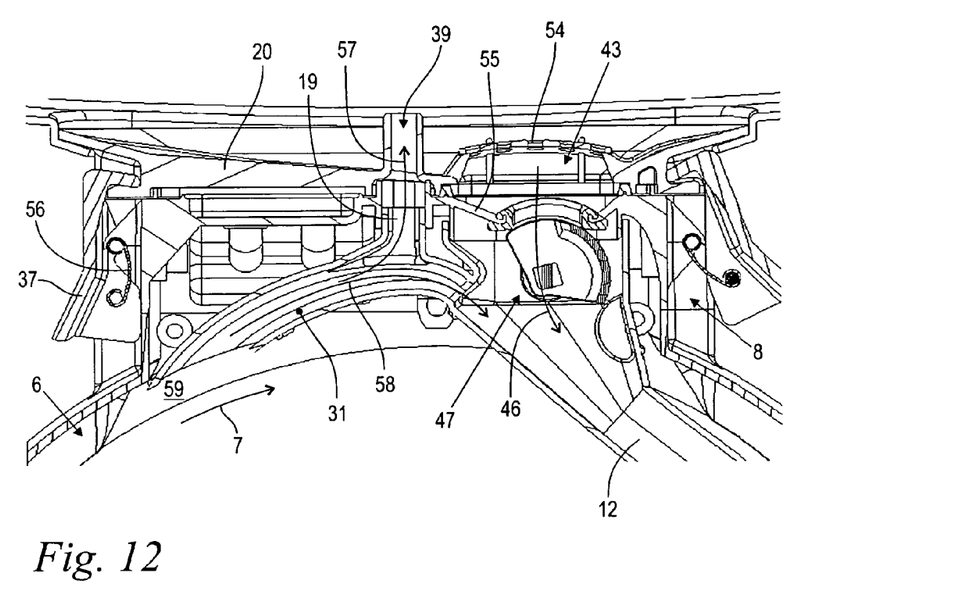
FIG. 12 is a section view of the arrangement of FIGS. 10 and 11 in the region of the adaptor and of the vessel base in the assembly position provided for the dust operation and showing details of a metering device for the dust medium.

In correspondence to FIG. 4, the adaptor 8 has a center line 25 and an up axis 41. Two recesses (73, 75) are formed in the upper flat side of the adaptor 8 on respective sides of the center line 25 and rotationally symmetrically to the up axis 41. The flat side faces toward the base 20 and the recesses (73, 75) have an identical approximately rectangular outline and are enclosed completely by respective frames (74, 76). The recess 75 is part of the channel section 11 of the solids channel 12 (FIG. 12). The flow section 15 of the flow line 16 (FIG. 1) and the return section 17 of the return line 18 (FIG. 1) open into the recess 73. The channel section 19 of the pressurized air channel 31 (FIG. 2) is guided through the adaptor 8 coaxially to the up axes (41, 40) as is further described above in connection with FIGS. 3 to 6.

The base 20 is formed essentially rectangularly and, on its lower side facing toward the adaptor 8, the base has lugs 52 in the region of its four corners, respectively. In the assembled state, the lugs 52 engage in corresponding ones of centering openings 53 of the adaptor 8. After the attachment of the base 20 by means of the two quick-release catches 37 on the adaptor 8, the base 20 is so aligned relative to the adaptor 8 that the two up axes (40, 41) lie coaxially to each other and the pressure opening 39 is connected pressure conductively and flow conductively to the channel section 19. The two center lines (21, 25) lie parallel to each other.

Furthermore, an overlapment of the opening 43 with the channel section 11 of the solids channel 12 (FIG. 12) is given in the built-in position provided for dust operation. The surrounding frame 76 seals the recess 75 with the channel section 11 with respect to the lower side of the base 20. In the outline, the opening 43, which corresponds to the two recesses (73, 75), extends pressure tight and flow conducting into the channel section 11. Dust medium made available in the supply vessel 4 can be moved through the opening 43 and the channel section 11 into the blower airflow 7 (FIG. 1). An additional part of the metering device 47 is arranged in the channel section 11 of the adaptor 8 to control the discharge quantity of the dust medium. This additional part is described in greater detail hereinafter in connection with FIGS. 12 and 13.

With the conversion from the dusting operation shown here into the spray operation, the supply vessel 4 (FIG. 10) including its base 20 is rotated by 180° about the up axis 40 and thereafter fixed relative to the adaptor 8 via the quick-release catches 37. This spray operation is provided for discharging the liquid spray medium from the same supply vessel 4 (FIG. 10). The opening 43 functions as a liquids opening 22 (FIG. 9) and is in overlapment with the recess 73. A pressure-tight and liquid-tight sealing is provided by the frame 74. The flow section 15 and the return section 17 open into the opening 43. The connection between the pressure opening 39 and the channel section 19 is maintained. The operation of the spray operation corresponds to the illustration of FIG. 9.

FIG. 12 is a cross-sectional view of the arrangement of FIGS. 10 and 11 in the region of the adaptor 8 and the base 20 in the assembled position provided for the spray operation. The two quick-release catches 37 are configured as tension clamps having spring clamps 56 which press the base 20 against the adaptor 8 under spring pretensioning.

The blower 6 is configured as a radial blower and moves, within the blower spiral, a blower airflow 7 which runs in the peripheral direction. An overpressure region 59 is formed radially outside close to the peripheral wall of the blower spiral. Bordering on the overpressure region 59, the pressurized air channel 31 is guided out of the peripheral wall of the blower spiral at a shallow angle with a slight radial directional component and branches a carrier airflow 58 away from the blower airflow 7. The pressurized air channel 31 opens into the solids channel 12 and conducts the carrier airflow 58 into the solids channel 12. Furthermore, the channel section 19 branches from the pressurized air channel 31 via which a component flow 57 of the carrier airflow 58 is introduced via the pressure opening 39 into the supply vessel 4 (FIG. 10).

The carrier airflow 58 is introduced into the solids channel 12 downstream of the metering device 47. As a consequence of its high flow velocity and the low air pressure associated therewith, the carrier airflow can cause a venturi effect downstream of the metering device 47 which draws by suction the powdered or granular dust medium from the supply vessel 4 (FIG. 10) through the sieve 54, the opening 43 and additional components of the metering device 47 along arrow 46 and the dust medium passes through the solids channel 12 into the blower tube 27 (FIG. 1). The above components of the metering device 47 are described in greater detail hereinafter in connection with FIG. 13. The above-mentioned conveyance of the dust medium is supported by an overpressure in the supply vessel 4 as a consequence of the component flow 57 introduced via the pressure opening 39. It can also be practical to omit the component flow 57 in the dusting configuration in that the pressure opening 39 lies in overlapment with the channel section 19 (FIG. 11) only in the spray operation.

Figure 13:
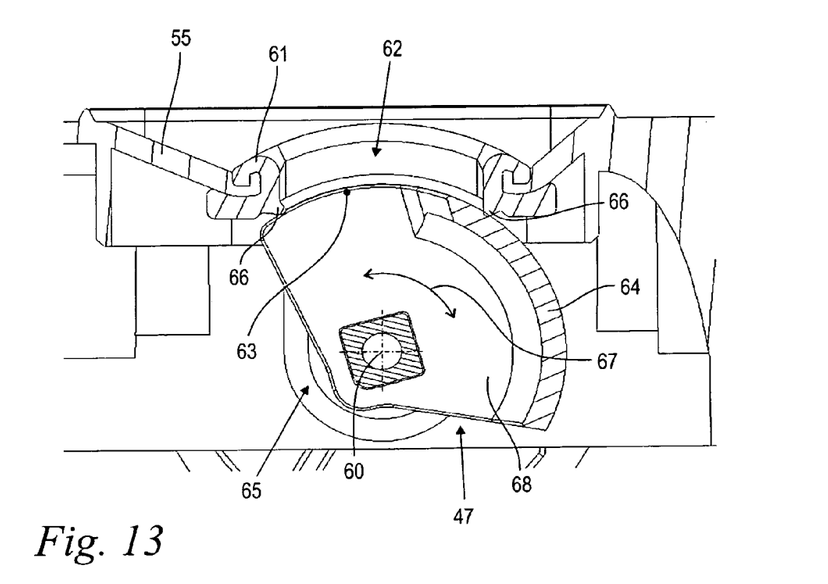
FIG. 13 is an enlarged detail view of the metering device of FIG. 12.

FIG. 13 shows an enlarged detail view of the metering device 47 of FIG. 12. In correspondence to FIG. 12, a funnel 55 is provided below on the opening 43. The funnel 55 forms the recess 75 (FIG. 11) and is formed in the adaptor 8. The funnel 55 is provided at its lower end with a metering window 62 which is bordered about its periphery by a seal frame 61 made of an elastic material. A metering body 68 is arranged below the seal frame 61 as part of the metering device 47. The metering body 68 is pivotally journalled about a pivot axis 60 in the direction of the double arrow 67. The metering body 68 is U-shaped in cross section and includes a part-cylindrical peripheral wall 64 from which a free region 63 extends in the peripheral direction. Peripheral seal lips 66 of the seal frame 61 lie against the metering body 68 and, depending upon its pivot angle position, lie against its part-cylindrical peripheral wall 64. Depending upon the pivot angle position of the metering body 68, the metering window 62 is in overlapment with a smaller or larger part of the free region 63 or the part-cylindrical peripheral wall 64. The pivot angle range of the metering body 68 extends from its position wherein the metering window 62 is completely in overlapment with the free region 63 up to a pivot position wherein the metering window 62 is completely closed by the part-cylindrical peripheral wall 64. A rotary plate 65 is formed with which the throughflow quantity of dust medium along arrow 46 (FIG. 12) can be continuously adjusted in dependence upon its pivot angle position in correspondence to the double arrow 67.

Figure 14:
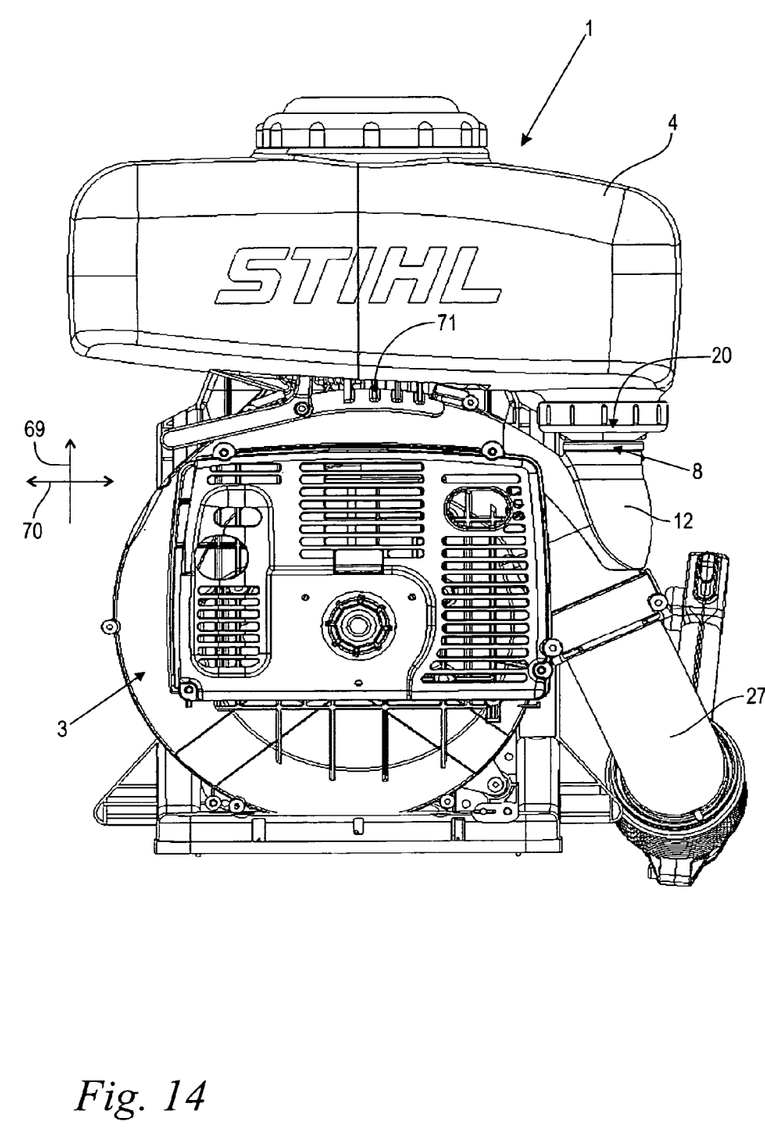
FIG. 14 is a rear elevation view of a spray apparatus configured in accordance with the invention and having an adaptor displaceable laterally and downwardly.

FIG. 14 is a rear elevation view of a further embodiment of the spray apparatus 1 of the invention. The spray apparatus 1 is shown in its usual work position whereby an up direction 69 and a lateral direction 70 are pregiven. The up direction 69 and the lateral direction 70 extend in the rotational plane of the blower unit 3 configured as a radial blower.

In the embodiment shown, the adaptor 8 is, departing from the embodiment of FIGS. 10 to 13 and referred to the lateral direction 70, not arranged centrally but is offset laterally. The same applies to the base 20 of the vessel 4. A base 20 which can correspond, in principle, to the base 20 of FIGS. 3 to 7, FIGS. 8 and 9 or FIGS. 10 to 13 is likewise arranged laterally to the center of the blower unit 3 referred to the lateral direction 70.

Referred to the up direction 69, the blower unit 3 has a highest point 71 which lies centrally to the blower unit 3 referred to the lateral direction 70. The vessel 4 is mounted above the highest point 71 without any significant intermediate space. Referred to the lateral direction 70, the adaptor 8 and the base 20 are arranged laterally and, referred to the up direction 69, below the highest point 71. An embodiment can also be practical wherein only the adaptor 8 but not the base 20 is provided below the highest point 71. The solids channel 12 extends below the adaptor 8 and opens into the discharge elbow close to the connection of the blower tube 27 laterally of the blower spiral of the blower unit 3. In this way, the structural height of the spray apparatus and therefore the height of the total mass center of gravity is reduced.

It is understood that the foregoing description is that of the preferred embodiments of the invention and that various changes and modifications may be made thereto without departing from the spirit and scope of the invention as defined in the appended claims.

What is claimed is:

1. A portable spray apparatus comprising:
    a back carrier frame;
    a blower unit mounted on said frame;
    a supply vessel mounted on said back carrier frame and having an interior space wherein a liquid spray medium and a solid dust medium are selectively held to be discharged by said apparatus;
    said blower unit including a drive motor and a blower driven by said drive motor to generate a blower airflow for selectively discharging the liquid spray medium and solid dust medium;
    an adaptor releasably connected to said supply vessel;
    a liquids channel for said liquid spray medium opening into said blower airflow;
    a solids channel for said solid dust medium opening into said blower airflow;
    said adaptor defining at least one channel section of said liquids channel and at least one channel section of said solids channel;
    said supply vessel and said adaptor having first and second built-in positions relative to each other and/or to said blower unit which are freely selectable by an operator of said apparatus and, in said first position, said liquids channel communicating with said interior space via said liquids section and, in said second position, said solids channel communicating with said interior space via said solids section; and,
    said channel section of said solids channel being closed in said first built-in position and said channel section of said liquids channel being closed in said second built-in position.

2. The portable spray apparatus of claim 1, wherein said channel section of said liquids channel is a first channel section of said liquids channel and said adaptor includes a second channel section of said liquids channel; and, wherein said apparatus further comprises a pressure pump mounted in said liquids channel and said liquids channel includes a flow line and a return line for said pressure pump; and, said first channel section of said liquids channel is a flow section of said flow line and said second channel section of said liquids channel is a return section of said return line.

3. The portable spray apparatus of claim 1, wherein said blower has an overpressure region and wherein said adaptor has a pressurized air channel section and said apparatus further comprises a pressurized air channel for supplying said pressurized air channel section with pressurized air from said overpressure region; and, said pressurized air channel is pressure-transmittingly connected to said interior space via said pressurized air channel section when said adaptor is in said first built-in position.

4. The portable spray apparatus of claim 3, wherein said pressurized air channel is pressure-transmittingly connected to said interior space via said pressurized air channel section when said adaptor is in both of said first and second built-in positions.

5. A portable spray apparatus comprising:
    a back carrier frame;
    a blower unit mounted on said frame;
    a supply vessel mounted on said back carrier frame and having an interior space wherein a liquid spray medium and a solid dust medium are selectively held to be discharged by said apparatus;
    said blower unit including a drive motor and a blower driven by said drive motor to generate a blower airflow for selectively discharging the liquid spray medium and solid dust medium;
    an adaptor releasably connected to said supply vessel;
    a liquids channel for said liquid spray medium opening into said blower airflow;

a solids channel for said solid dust medium opening into said blower airflow;

said adaptor defining at least one channel section of said liquids channel and at least one channel section of said solids channel;

said supply vessel and said adaptor having first and second built-in positions relative to each other and/or to said blower unit which are freely selectable by an operator of said apparatus and, in said first position, said liquids channel communicating with said interior space via said liquids section and, in said second position, said solids channel communicating with said interior space via said solids section;

said supply vessel having a base having a center line;

said base having a liquids opening formed therein assigned to said channel section of said liquids channel and a solids opening formed therein assigned to said channel section of said solids channel;

said liquids opening and said solids opening being disposed on the same side of said center line;

said adaptor having a center line; and, said channel section of said liquids channel and said channel section of said solids channel being disposed on different sides of said center line of said adaptor.

6. The portable spray apparatus of claim 5, wherein said liquids opening and said solids opening are conjointly formed by a single opening in said base of said supply vessel.

7. A portable spray apparatus comprising:

a back carrier frame;

a blower unit mounted on said frame;

a supply vessel mounted on said back carrier frame and having an interior space wherein a liquid spray medium and a solid dust medium are selectively held to be discharged by said apparatus;

said blower unit including a drive motor and a blower driven by said drive motor to generate a blower airflow for selectively discharging the liquid spray medium and solid dust medium;

an adaptor releasably connected to said supply vessel;

a liquids channel for said liquid spray medium opening into said blower airflow;

a solids channel for said solid dust medium opening into said blower airflow;

said adaptor defining at least one channel section of said liquids channel and at least one channel section of said solids channel;

said supply vessel and said adaptor having first and second built-in positions relative to each other and/or to said blower unit which are freely selectable by an operator of said apparatus and, in said first position, said liquids channel communicating with said interior space via said liquids section and, in said second position, said solids channel communicating with said interior space via said solids section; and, there being a fixed non-changeable built-in position of said supply vessel and two different built-in positions of said adaptor being provided.

8. The portable spray apparatus of claim 7, wherein said supply vessel is releasably connected directly to said blower unit with said adaptor being disposed therebetween.

9. The portable spray apparatus of claim 7, wherein said adaptor is configured as a separate adaptor plate defining an up axis and two center lines; and, said two different built-in positions of said adaptor are formed by rotation of said adaptor plate about one of said center lines thereof or about said up axis thereof.

10. The portable spray apparatus of claim 9, wherein said supply vessel is releasably connected directly to said blower unit with said adaptor plate being disposed therebetween.

11. A portable spray apparatus comprising:

a back carrier frame;

a blower unit mounted on said frame;

a supply vessel mounted on said back carrier frame and having an interior space wherein a liquid spray medium and a solid dust medium are selectively held to be discharged by said apparatus;

said blower unit including a drive motor and a blower driven by said drive motor to generate a blower airflow for selectively discharging the liquid spray medium and solid dust medium;

an adaptor releasably connected to said supply vessel;

a liquids channel for said liquid spray medium opening into said blower airflow;

a solids channel for said solid dust medium opening into said blower airflow;

said adaptor defining at least one channel section of said liquids channel and at least one channel section of said solids channel;

said supply vessel and said adaptor having first and second built-in positions relative to each other and/or to said blower unit which are freely selectable by an operator of said apparatus and, in said first position, said liquids channel communicating with said interior space via said liquids section and, in said second position, said solids channel communicating with said interior space via said solids section; and, there being a fixed non-changeable built-in position of said adaptor and two different built-in positions of said supply vessel.

12. The portable spray apparatus of claim 11, wherein said adaptor is fixedly connected to said blower unit;

and, said supply vessel is releasably connected directly to said adaptor.

13. A portable spray apparatus comprising:

a back carrier frame;

a blower unit mounted on said frame;

a supply vessel mounted on said back carrier frame and having an interior space wherein a liquid spray medium and a solid dust medium are selectively held to be discharged by said apparatus;

said blower unit including a drive motor and a blower driven by said drive motor to generate a blower airflow for selectively discharging the liquid spray medium and solid dust medium;

an adaptor releasably connected to said supply vessel;

a liquids channel for said liquid spray medium opening into said blower airflow;

a solids channel for said solid dust medium opening into said blower airflow;

said adaptor defining at least one channel section of said liquids channel and at least one channel section of said solids channel;

said supply vessel and said adaptor having first and second built-in positions relative to each other and/or to said blower unit which are freely selectable by an operator of said apparatus and, in said first position, said liquids channel communicating with said interior space via said liquids section and, in said second position, said solids channel communicating with said interior space via said solids section;

said blower unit having a highest point and being configured as a radial blower defining a rotational plane;

said spray apparatus having a usual work position wherein said spray apparatus is held by an operator;

said apparatus having an up direction and a lateral direction referred to said usual work position with said lateral direction being defined by said rotational plane of said blower unit; and, said adaptor, referred to said up direction and said lateral direction, being disposed laterally and below said highest point of said blower unit.

14. The portable spray apparatus of claim 13, wherein said supply vessel has a base; and, said adaptor and said base of said supply vessel, referred to said up direction and said lateral direction, are disposed laterally and below said highest point of said blower unit.

15. A portable spray apparatus comprising a back carrier frame;

a blower unit mounted on said frame;

a supply vessel mounted on said back carrier frame and having an interior space wherein a liquid spray medium and a solid dust medium are selectively held to be discharged by said apparatus;

said blower unit including a drive motor and a blower driven by said drive motor to generate a blower airflow for selectively discharging the liquid spray medium and solid dust medium;

an adaptor releasably connected to said supply vessel;

a liquids channel for said liquid spray medium opening into said blower airflow;

a solids channel for said solid dust medium opening into said blower airflow;

said adaptor defining at least one channel section of said liquids channel and at least one channel section of said solids channel;

said supply vessel and said adaptor having first and second built-in positions relative to each other and/or to said blower unit which are freely selectable by an operator of said apparatus and, in said first position, said liquids channel communicating with said interior space via said liquids section and, in said second position, said solids channel communicating with said interior space via said solids section;

a metering device for said dust medium; and, said metering device being configured as a rotating disc.

16. The portable spray apparatus of claim 15, further comprising channel means for guiding a carrier airflow into said solids channel downstream of said metering device.

* * * * *